(12) United States Patent
Hill et al.

(10) Patent No.: US 12,048,270 B2
(45) Date of Patent: Jul. 30, 2024

(54) VELOCITY CONTROL FOR IMPROVING CROSS TRACK ERROR OF IMPLEMENT-EQUIPPED MACHINES

(71) Applicant: Trimble Inc., Sunnyvale, CA (US)

(72) Inventors: Jason Hill, Superior, CO (US); Mark Gibson, Portland, OR (US)

(73) Assignee: PTx Trimble LLC, Westminster, CO (US)

( * ) Notice: Subject to any disclaimer, the term of this patent is extended or adjusted under 35 U.S.C. 154(b) by 493 days.

(21) Appl. No.: 17/212,824

(22) Filed: Mar. 25, 2021

(65) Prior Publication Data
US 2022/0304227 A1    Sep. 29, 2022

(51) Int. Cl.
*A01D 41/127* (2006.01)
*G01S 19/52* (2010.01)

(52) U.S. Cl.
CPC ............ *A01D 41/127* (2013.01); *G01S 19/52* (2013.01)

(58) Field of Classification Search
None
See application file for complete search history.

(56) References Cited

U.S. PATENT DOCUMENTS

| | | | |
|---|---|---|---|
| 6,901,319 B1 * | 5/2005 | Nelson | G05D 1/027 303/146 |
| 8,190,364 B2 | 5/2012 | Rekow | |
| 10,599,151 B1 * | 3/2020 | Gunbatar | A01B 69/004 |
| RE48,527 E * | 4/2021 | Reeve | G05D 1/0231 |
| 2008/0086249 A1 * | 4/2008 | Lange | A01B 15/20 701/41 |
| 2009/0326763 A1 * | 12/2009 | Rekow | A01B 69/008 701/42 |

(Continued)

FOREIGN PATENT DOCUMENTS

| | | |
|---|---|---|
| EP | 1 756 687 A1 | 2/2007 |
| EP | 2 114 751 A1 | 11/2009 |

(Continued)

OTHER PUBLICATIONS

D. Langan, R. Vraa and C. Xu, "Machine-Vision Based Location Detection Solutions for Autonomous Horticulture Rover During Early Growth Season," 2018 IEEE International Conference on Intelligence and Safety for Robotics (ISR), Shenyang, China, 2018, pp. 429-434, doi: 10.1109/IISR.2018.8535837. (Year: 2018).*

(Continued)

*Primary Examiner* — Jelani A Smith
*Assistant Examiner* — Jacob Daniel Underbakke

(57) ABSTRACT

Described herein are systems, methods, and other techniques for controlling a velocity of an implement-equipped machine. An actual position of the implement-equipped machine is estimated based on sensor data captured using the machine's sensors. A cross track error between a target position and the actual position is calculated. An actual cross track error metric is calculated based on the cross track error. The actual cross track error metric is compared to a target cross track error metric to determine a velocity adjustment, where the velocity adjustment is determined so as to reduce a difference between the actual cross track error metric and (Continued)

the target cross track error metric. The velocity of the implement-equipped machine is adjusted by the velocity adjustment.

16 Claims, 7 Drawing Sheets

(56) References Cited

U.S. PATENT DOCUMENTS

| | | | |
|---|---|---|---|
| 2011/0118938 A1* | 5/2011 | MacDonald | G01S 5/02521 701/1 |
| 2017/0147005 A1* | 5/2017 | Ramm | G05D 1/0295 |
| 2018/0373257 A1* | 12/2018 | Runde | A01B 69/007 |
| 2019/0204351 A1* | 7/2019 | Zielke | G01S 17/46 |
| 2020/0033146 A1* | 1/2020 | Cash | G01S 19/51 |
| 2020/0337236 A1* | 10/2020 | Kelber | A01D 41/127 |

FOREIGN PATENT DOCUMENTS

| | | | | |
|---|---|---|---|---|
| WO | 2005/119386 A1 | 12/2005 | | |
| WO | WO-2005119386 A1 * | 12/2005 | | A01B 69/008 |
| WO | 2008/080193 A1 | 7/2008 | | |
| WO | WO-2020257456 A1 * | 12/2020 | | A01C 23/042 |

OTHER PUBLICATIONS

I. Sharp, K. Yu and T. Sathyan, "Positional Accuracy Measurement and Error Modeling for Mobile Tracking," in IEEE Transactions on Mobile Computing, vol. 11, No. 6, pp. 1021-1032, Jun. 2012, doi: 10.1109/TMC.2011.119. (Year: 2012).*

K. Cumali and E. Armagan, "Steering Control of a Vehicle Equipped with Automated Lane Centering System," 2019 11th International Conference on Electrical and Electronics Engineering (ELECO), Bursa, Turkey, 2019, pp. 820-824, (Year: 2019).*

Vilas Samak, C., Vilas Samak, T., & Kandhasamy, S. "Control Strategies for Autonomous Vehicles" 2020, arXiv:2011.08729. doi: 10.48550/arXiv.2011.08729 (Year: 2020).*

Extended European Search Report for Application No. 22162458.8-1004, mailed Aug. 22, 2022, 12 pages.

Ali, S. M. A. et al., "Designing and simulation a motion Controller for a Wheeled Mobile Robot Autonomous Navigation" Proceedings of SPIE vol. 6006, (2005), 12 pages.

* cited by examiner

VELOCITY CONTROL FOR IMPROVING CROSS TRACK ERROR OF IMPLEMENT-EQUIPPED MACHINES

BACKGROUND OF THE INVENTION

Modern mobile machinery, including construction and agricultural machines, have dramatically increased the efficiency of performing various work-related tasks. For example, earthmoving machines employing automatic slope control systems are able to grade project areas using fewer passes than what was previously done manually. As another example, modern mobile agricultural machines have dramatically increased the efficiency of harvesting a variety of grain crops, including wheat, corn, oats, rye, barley, among others. Such machines may be guided in part by various cameras and sensors mounted to the machines, such as one or more global navigation satellite systems (GNSS) receivers which use wireless signals transmitted from medium Earth orbit (MEO) satellites to generate position estimates of the machines. The emergence of self-driving harvesting combines along with other row-guided farm vehicles has reduced the amount of row overlap, which has translated into reduced fuel costs and less wear to the vehicles.

Much of the technological advances of mobile machinery are owed in part to the availability of accurate sensors that allow real-time monitoring of the condition and position of a machine's components and/or the environment surrounding the machine. Despite the improvements to modern mobile machinery, new systems, methods, and techniques are still needed.

BRIEF SUMMARY OF THE INVENTION

The present disclosure relates broadly to techniques for controlling the velocity of mobile machines. In particular, many embodiments described herein relate to velocity-adjustment techniques for mobile machines equipped with implements, such as agricultural machines and earthmoving construction machines.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of controlling a velocity of an implement-equipped machine, the method comprising: capturing sensor data using one or more sensors of the implement-equipped machine while the implement-equipped machine is moving at the velocity in a forward or a backward direction; estimating an actual position of the implement-equipped machine based on the sensor data captured using the one or more sensors; calculating a cross track error between a target position and the actual position; calculating an actual cross track error metric based on the cross track error; comparing the actual cross track error metric to a target cross track error metric to determine a velocity adjustment, wherein the velocity adjustment is determined so as to reduce a difference between the actual cross track error metric and the target cross track error metric; and adjusting the velocity of the implement-equipped machine by the velocity adjustment.

Example 2 is the computer-implemented method of example(s) 1, further comprising: estimating a plurality of actual positions of the implement-equipped machine based on the sensor data, the plurality of actual positions including the actual position; and calculating a plurality of cross track errors between a plurality of target positions and the plurality of actual positions, the plurality of cross track errors including the cross track error and the plurality of target positions including the target position; wherein the actual cross track error metric is calculated based on the plurality of cross track errors.

Example 3 is the computer-implemented method of example(s) 1, further comprising: determining a guidance line for the implement-equipped machine, the guidance line including the target position, wherein the cross track error is calculated between the guidance line and the actual position.

Example 4 is the computer-implemented method of example(s) 1, wherein adjusting the velocity of the implement-equipped machine by the velocity adjustment includes: providing the velocity adjustment to a velocity controller of the implement-equipped machine.

Example 5 is the computer-implemented method of example(s) 1, wherein the one or more sensors include a global navigation satellite systems (GNSS) receiver mounted to the implement-equipped machine.

Example 6 is the computer-implemented method of example(s) 1, wherein the actual cross track error metric is calculated based on a bias component of the cross track error.

Example 7 is the computer-implemented method of example(s) 1, wherein the actual cross track error metric is calculated based on a variation component of the cross track error.

Example 8 is the computer-implemented method of example(s) 1, wherein comparing the actual cross track error metric to the target cross track error metric to determine the velocity adjustment includes: calculating the difference between the actual cross track error metric and the target cross track error metric; and determining the velocity adjustment based on the difference.

Example 9 is a non-transitory computer-readable medium comprising instructions that, when executed by one or more processors, cause the one or more processors to perform operations for controlling a velocity of an implement-equipped machine, the operations comprising: capturing sensor data using one or more sensors of the implement-equipped machine while the implement-equipped machine is moving at the velocity in a forward or a backward direction; estimating an actual position of the implement-equipped machine based on the sensor data captured using the one or more sensors; calculating a cross track error between a target position and the actual position; calculating an actual cross track error metric based on the cross track error; comparing the actual cross track error metric to a target cross track error metric to determine a velocity adjustment, wherein the velocity adjustment is determined so as to reduce a difference between the actual cross track error metric and the target cross track error metric; and adjusting the velocity of the implement-equipped machine by the velocity adjustment.

Example 10 is the non-transitory computer-readable medium of example(s) 9, further comprising: estimating a plurality of actual positions of the implement-equipped machine based on the sensor data, the plurality of actual positions including the actual position; and calculating a plurality of cross track errors between a plurality of target positions and the plurality of actual positions, the plurality of cross track errors including the cross track error and the plurality of target positions including the target position; wherein the actual cross track error metric is calculated based on the plurality of cross track errors.

Example 11 is the non-transitory computer-readable medium of example(s) 9, further comprising: determining a guidance line for the implement-equipped machine, the guidance line including the target position, wherein the cross track error is calculated between the guidance line and the actual position.

Example 12 is the non-transitory computer-readable medium of example(s) 9, wherein adjusting the velocity of the implement-equipped machine by the velocity adjustment includes: providing the velocity adjustment to a velocity controller of the implement-equipped machine.

Example 13 is the non-transitory computer-readable medium of example(s) 9, wherein the one or more sensors include a global navigation satellite systems (GNSS) receiver mounted to the implement-equipped machine.

Example 14 is the non-transitory computer-readable medium of example(s) 9, wherein the actual cross track error metric is calculated based on a bias component of the cross track error.

Example 15 is the non-transitory computer-readable medium of example(s) 9, wherein the actual cross track error metric is calculated based on a variation component of the cross track error.

Example 16 is the non-transitory computer-readable medium of example(s) 9, wherein comparing the actual cross track error metric to the target cross track error metric to determine the velocity adjustment includes: calculating the difference between the actual cross track error metric and the target cross track error metric; and determining the velocity adjustment based on the difference.

Example 17 is a system comprising: one or more processors; and a computer-readable medium comprising instructions that, when executed by the one or more processors, cause the one or more processors to perform operations comprising: capturing sensor data using one or more sensors of a implement-equipped machine while the implement-equipped machine is moving at a velocity in a forward or a backward direction; estimating an actual position of the implement-equipped machine based on the sensor data captured using the one or more sensors; calculating a cross track error between a target position and the actual position; calculating an actual cross track error metric based on the cross track error; comparing the actual cross track error metric to a target cross track error metric to determine a velocity adjustment, wherein the velocity adjustment is determined so as to reduce a difference between the actual cross track error metric and the target cross track error metric; and adjusting the velocity of the implement-equipped machine by the velocity adjustment.

Example 18 is the system of example(s) 17, further comprising: estimating a plurality of actual positions of the implement-equipped machine based on the sensor data, the plurality of actual positions including the actual position; and calculating a plurality of cross track errors between a plurality of target positions and the plurality of actual positions, the plurality of cross track errors including the cross track error and the plurality of target positions including the target position; wherein the actual cross track error metric is calculated based on the plurality of cross track errors.

Example 19 is the system of example(s) 17, further comprising: determining a guidance line for the implement-equipped machine, the guidance line including the target position, wherein the cross track error is calculated between the guidance line and the actual position.

Example 20 is the system of example(s) 17, wherein adjusting the velocity of the implement-equipped machine by the velocity adjustment includes: providing the velocity adjustment to a velocity controller of the implement-equipped machine.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
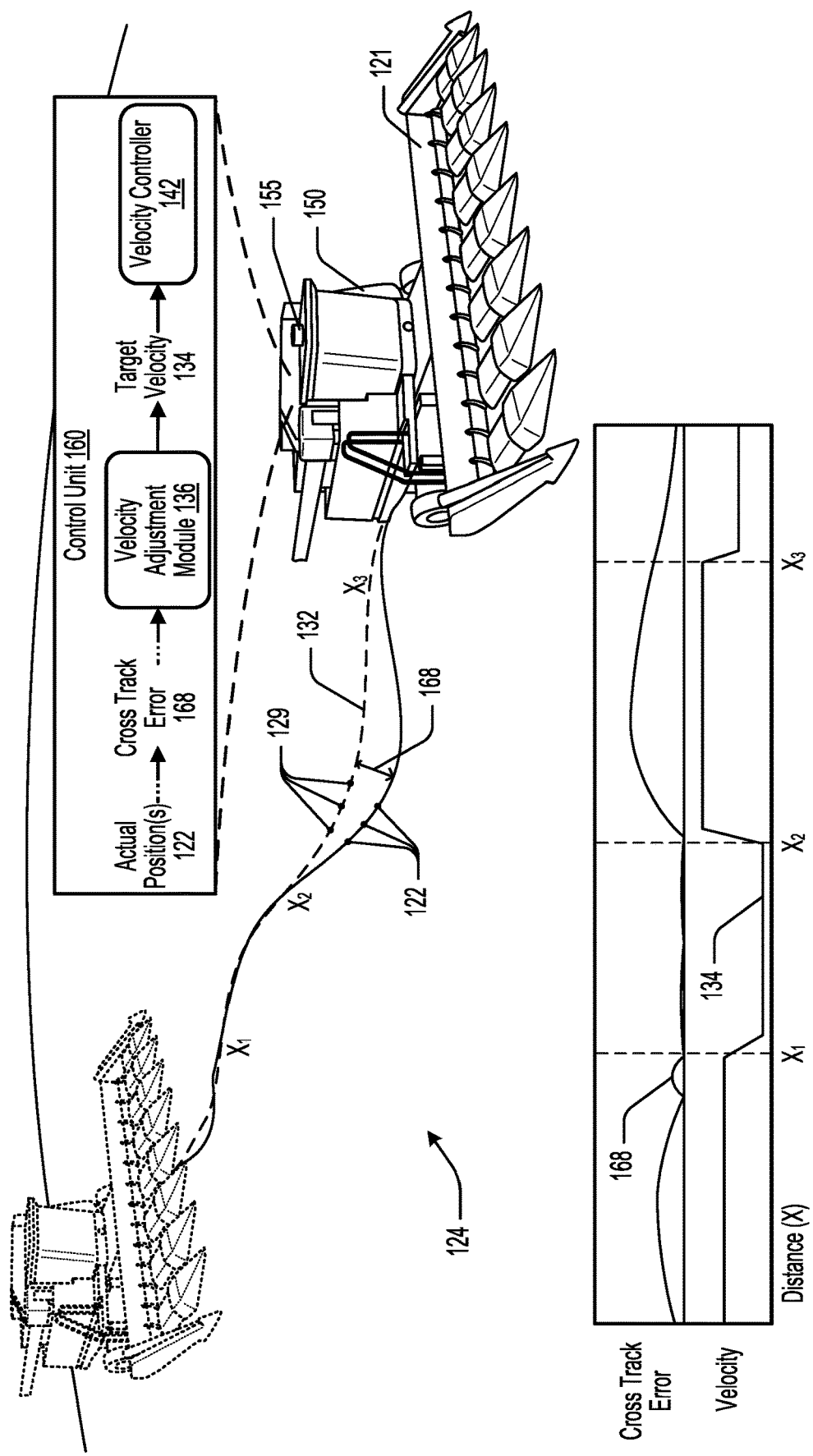
FIG. 1 illustrates an example implementation of one or more techniques of the present disclosure within an agricultural environment.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Embodiments described herein relate to systems, methods, and other techniques for controlling the velocity of a mobile machine, such as a mobile machine equipped with an implement for performing work-related tasks. By controlling the machine velocity in the manner described, better horizontal steering of the mobile machine and horizontal control of the implement can be achieved. Embodiments described herein can improve the horizontal control of an implement for a range of surface types. For certain agricultural implementations, the improved horizontal control can result in a better as-built row/furrow in a field, which can minimize soil compaction and maximize area coverage. Improved horizontal control can further improve the coverage of seed planting, the application of nutrients (e.g., fertilizer), and the administration of spraying, among other benefits.

In some embodiments, the mobile machine may be controlled so as to adjust (e.g., reduce) the machine's cross track error, which may be defined as the horizontal distance between the machine's position and a guidance path the machine is attempting to follow. In some embodiments, the cross track error may be calculated as the length of the vector that starts at the machine's position, ends at the guidance path, and is orthogonal to the machine's direction of travel. In some embodiments, the cross track error may be calculated as the length of the vector that starts at the guidance path, ends at the machine's position, and is orthogonal to the guidance path. For example, in some instances, if the mobile machine is commanded to move exactly along the local X-axis, the cross track error may be calculated as the Y-axis component of the machine's position. Various possibilities and alternatives for the definition of the cross track error are contemplated and are considered to be within the scope of the present disclosure.

There are various sources of cross track error. Some sources are system related and are due to the limitations of measurement devices, such as noisy data that may be detected by a global navigation satellite systems (GNSS) receiver or an inertial measurement unit (IMU). Other sources may be machine related, such as imprecise steering linkages or slow delay responses from machine actuators. For example, the mobile machine may take more time to turn by some amount (e.g., two degrees) than the machine control system anticipates. Other sources may be due to the external environment, such as uneven ground slope or nonideal soil conditions (e.g., slippery terrain).

In some embodiments, the cross track error can be decreased to a desirable amount in accordance with a tolerance referred to as a target cross track error metric. The target cross track error metric may be chosen to balance efficiency and accuracy so that a project may be completed in a timely manner while maintaining a particular level of quality. Some embodiments provide for an additional control loop that, while running, takes vehicle travel speed into account as it affects the stability of the primary steering control loop that is handling horizontal steering control for the vehicle. This additional control loop, referred to as the velocity control loop, can increase or decrease the velocity of the machine in conjunction with the horizontal steering control loop to achieve optimal results.

In some embodiments, a control unit can measure and record statistics as they relate to the horizontal movement of the mobile machine. The control loop can, for example, track the machine's actual position(s) as it travels within the site (e.g., field, paddock, work area, etc.).

The control unit can also monitor the guidance line that the machine is to follow, which may include points referred to as the machine's target position(s). These two positions (actual and target) can form the core of the data the velocity control loop takes as input to process on and make velocity adjustments. The velocity control loop can utilize a form of hysteresis to avoid overdriving or overcorrecting the velocity of the platform. The velocity control loop can further be made aware of what machine make/model it is installed on and, based on test data, have a predetermined velocity range for which it is more likely that optimal stability will be achieved.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example implementation of one or more techniques of the present disclosure within an agricultural environment. Specifically, FIG. 1 shows an implement-equipped machine 150 being deployed at a site 124 and having the control thereof at least partially implemented by a control unit 160 which, in various embodiments, may be communicatively coupled to a position sensor 155 that is mounted to implement-equipped machine 150. While site 124 is generally described herein as corresponding to an agricultural site such as a field, the present disclosure is applicable to a wide variety of agricultural, construction, or industrial projects in which mobile machines or vehicles are used. Similarly, while implement-equipped machine 150 is generally described herein as corresponding to an agricultural machine, the various techniques described herein are applicable to a wide variety of mobile machines such as graders, excavators, bulldozers, backhoes, pavers (e.g., concrete, asphalt, slipform, vibratory, etc.), compactors, scrapers, loaders, material handlers, agricultural tractors, combine harvesters, spreaders, sprayers, seeders, self-propelled grain carts, and the like.

In some embodiments, implement-equipped machine 150 may include a tractor with wheels, axles, and a gasoline-, diesel-, electric-, or steam-powered engine for providing power and traction to implement-equipped machine 150 to drive along a desired path, often at a constant speed. In some instances, implement-equipped machine 150 may be a tracked vehicle that incorporates a continuous track of treads or track plates that are driven by the vehicle's wheels. An operator of implement-equipped machine 150 may provide inputs to control unit 160 using various input devices such as levers, switches, buttons, pedals, steering wheels, and touch screens, which can cause various actuators to move implement-equipped machine 150.

Implement-equipped machine 150 may include an implement 121, which may be the primary component of the machine that is controlled to interact with elements of site 124. For example, at an agricultural site, implement 121 may be the header of a combine harvester or the boom of a sprayer. As another example, at an earthmoving site, implement 121 may be the component of implement-equipped machine 150 that interacts with (e.g., pushes, scoops, cuts, digs, compresses, etc.) the material to be graded, such as the blade of a bulldozer, the bucket of an excavator, the drum of a compactor, or some other ground-engaging tool. As another example, at a road construction site, implement 121 may be the screed of an asphalt paver.

During operation, in some examples, control unit 160 may determine a set of actual positions 122 (alternatively referred to as geospatial positions) of implement-equipped machine 150 based on sensor data captured by one or more sensors (e.g., position sensor 155) mounted to implement-equipped machine 150. For example, position sensor 155 may be a GNSS receiver that receives wireless signals from one or more GNSS satellites. By processing the received wireless signals, actual positions 122 of the GNSS receiver (and likewise the machine) may be calculated. The set of actual positions 122 may form an actual path of implement-equipped machine 150, as shown in FIG. 1.

In some examples, implement-equipped machine 150 may attempt to follow a guidance line 132 (alternatively referred to as the AB line) by driving actual position(s) 122 toward guidance line 132. Guidance line 132 may be generated in a number of ways. For example, guidance line 132 may be set in reference (e.g., in parallel) to a previous guidance line or an initial AB line created by the machine, or may be specified in a site design that is being completed by the machine. Guidance line 132 may include a set of target positions 129 that define points along guidance line 132. In some instances, control unit 160 may attempt to control implement-equipped machine 150 in such a way that actual positions 122 are driven toward target positions 129.

In some embodiments, control unit 160 may compare actual positions 122 to guidance line 132 (or target positions 129) to calculate a cross track error 168 between the two. Cross track error 168 may be used by a steering control loop and/or a steering controller to generate steering commands for implement-equipped machine 150. Additionally, cross track error 168 may be used by a velocity adjustment module 136 to determine a new target velocity 134 for implement-equipped machine 150. In some instances, if cross track error 168 is sufficiently large, target velocity 134 is caused to decrease, and if cross track error 168 is sufficiently small, target velocity 134 is caused to increase. Finally, target velocity 134 may be fed into a velocity controller 142, which may employ various control mechanisms (such as, for example, a PID controller) for driving an actual velocity toward target velocity 134.

In the illustrated example, while implement-equipped machine 150 attempts to follow guidance line 132, upon reaching point $X_1$, cross track error 168 is determined to be sufficiently large and, as a result, velocity adjustment module 136 determines that target velocity 134 should be decreased. Upon implement-equipped machine 150 reaching point $X_2$, cross track error 168 is determined to be sufficiently small and, as a result, velocity adjustment module 136 determines that target velocity 134 should be increased. Upon implement-equipped machine 150 reaching point $X_3$, cross track error 168 is again determined to be sufficiently large and, as a result, velocity adjustment module 136 determines that target velocity 134 should be decreased. Thereafter, implement-equipped machine 150 arrives at a final velocity, which produces a cross track error 168 that is determined to be within an acceptable range.

Figure 2:
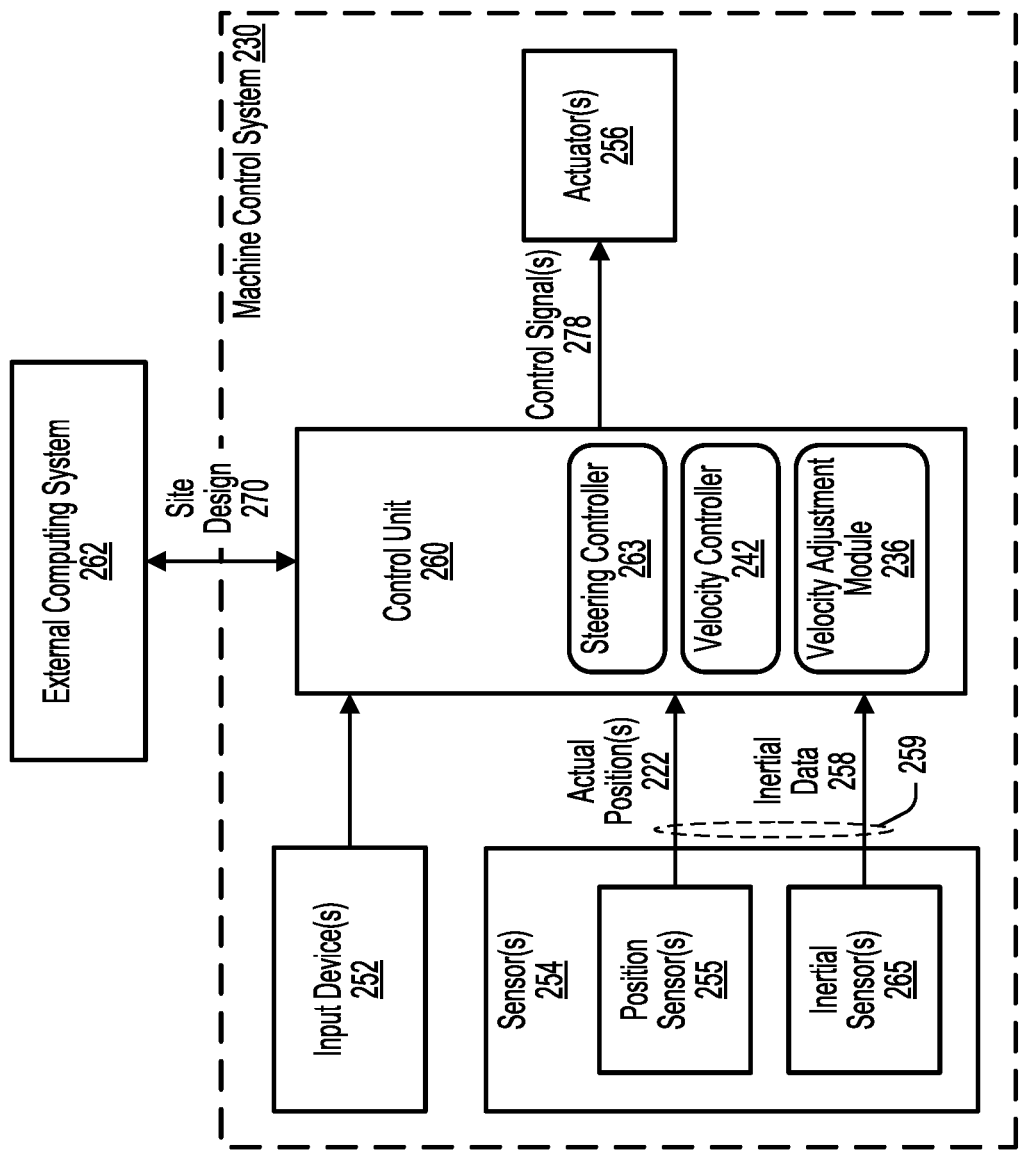
FIG. 2 illustrates an example machine control system.

FIG. 2 illustrates an example machine control system 230, in accordance with some embodiments of the present disclosure. Machine control system 230 may include various input devices 252, sensors 254, actuators 256, and computing devices for allowing one or more operators of the mobile machine to complete a work-related task. The components of machine control system 230 may be mounted to or integrated with the components of the mobile machine such that the mobile machine may include machine control system 230. The components of machine control system 230 may be communicatively coupled to each other via one or more wired and/or wireless connections.

Machine control system 230 may include a control unit 260 that receives data from the various sensors and inputs and generates commands that are sent to the various actuators and output devices. In the illustrated example, control unit 260 receives input data from input device(s) 252 and sensor data 259 from sensor(s) 254, and generates control signal(s) 278 which are sent to actuator(s) 256. Control unit 260 may include one or more processors and an associated memory. In some embodiments, control unit 260 may be communicatively coupled to an external computing system 262 located external to machine control system 230 and the mobile machine. External computing system 262 may send instructions to control unit 260 of the details of a work-related task. For example, external computing system 262 may send a site design 270 to control unit 260. External computing system 262 may also send alerts and other general information to control unit 260, such as traffic conditions, weather conditions, the locations and status of material transfer vehicles, and the like.

In some embodiments, machine control system 230 includes one or more input device(s) 252 for receiving various input data (e.g., a target guidance line, a target velocity, a target grade, a site plan) from a user. Input device(s) 252 may include a keyboard, a touchscreen, a touchpad, a switch, a lever, a button, a steering wheel, an acceleration pedal, a brake pedal, and the like. Input device(s) 252 may be mounted to any physical part of the mobile machine. Input device(s) 252 may further receive user inputs indicating a desired movement of the mobile machine, a desired movement of the implement, and the like.

In some embodiments, sensor(s) 254 may include one or more position sensor(s) 255, inertial sensor(s) 265, image capture devices, proximity sensors, ground-sensing radar devices, and/or Hall-effect sensors, among other possibilities. Position sensor(s) 255 may be configured to capture sensor data 259 from which one or more actual position(s) 222 may be estimated. In some embodiments, each of actual position(s) 222 may include a two-dimensional (2D) or three-dimensional (3D) coordinate within a world reference frame. For example, each of actual position(s) 222 may include an x-, y-, and z-coordinate that correspond to the machine's position at a particular instant in time. Position sensor(s) 255 may be a combination of GNSS receivers, which determine position using wireless signals received from satellites, and total stations, which determine position by combining distance, vertical angle, and horizontal angle measurements.

Inertial sensor(s) 265 may be configured to capture inertial data 258, which may be data related to the movement of components of the mobile machine to which the sensor(s) are rigidly attached or mounted. For example, inertial sensor(s) 265 may include one or more gyroscopes for detecting angular acceleration, angular rate and/or angular position, one or more accelerometers for detecting linear acceleration, linear velocity, and/or linear position, one or more IMUS which may each include one or more accelerometers, one or more gyroscopes, and/or one or more magnetometers for detecting the above-listed types of data, among other possibilities.

In some embodiments, inertial sensor(s) 265 may directly detect angular rate and may integrate to obtain angular position, or alternatively an inertial sensor may directly measure angular position and may determine a change in angular position (e.g., compute the derivative) to obtain angular rate. In many instances, inertial sensor(s) 265 can be used to determine the yaw angle (rotation angle with respect to a vertical axis), the pitch angle (rotation angle with respect to a transverse axis), and/or the roll angle (rotation angle with respect to a longitudinal axis) of a component of the mobile machine.

Control unit 260 may include various controllers and modules to assist in the generation of control signal(s) 278. Each of the controllers and modules may include dedicated hardware and/or may be performed using the main processor and/or memory of control unit 260. In some embodiments, control unit 260 includes a steering controller 263 that drives an actual/measured/estimated steering angle toward a target steering angle. In some instances, steering controller 263 performs a comparison between the actual steering angle and the target steering angle, and generates control signal(s) 278 so as to cause actuator(s) 256 to move in a way that drives the measured steering angle toward the target steering angle. In some embodiments, steering controller 263 may include or may operate in conjunction with a steering control loop that attempts to drive the cross track error toward zero by generating control signal(s) 278 that steer the mobile machine toward the guidance line.

Similarly, control unit 260 may include a velocity controller 242 that drives an actual/measured/estimated velocity toward a target velocity. In some instances, velocity controller 242 receives the measured velocity or calculates a measured velocity using sensor data 259, performs a comparison between the measured velocity and the target velocity, and generates control signal(s) 278 so as to cause actuator(s) 256 to move in a way that drives the measured velocity toward the target velocity. Control unit 260 may further include a velocity adjustment module 236 that adjusts the current target velocity being operated on by velocity controller 242. As will be described below in reference to FIG. 3, the velocity adjustment module may be provided with the cross track error and may calculate a velocity adjustment based thereon.

Control signal(s) 278 may include direct current (DC) or alternating current (AC) voltage signals, DC or AC current signals, and/or information-containing signals. An example of an information-containing signal may be controller area network (CAN) message that may be sent along a CAN bus or other communication medium. In some instances, one or more of control signal(s) 278 may include a pneumatic or hydraulic pressure. Upon receiving control signal(s) 278, actuator(s) 256 may be caused to move in a specified manner, such as by extending, retracting, rotating, lifting, or lowering by a specified amount. Actuator(s) 256 may use various forms of power to provide movement to the components of the mobile machine. For example, actuator(s) 256 may be electric, hydraulic, pneumatic, mechanical, or thermal, among other possibilities.

Figure 3:
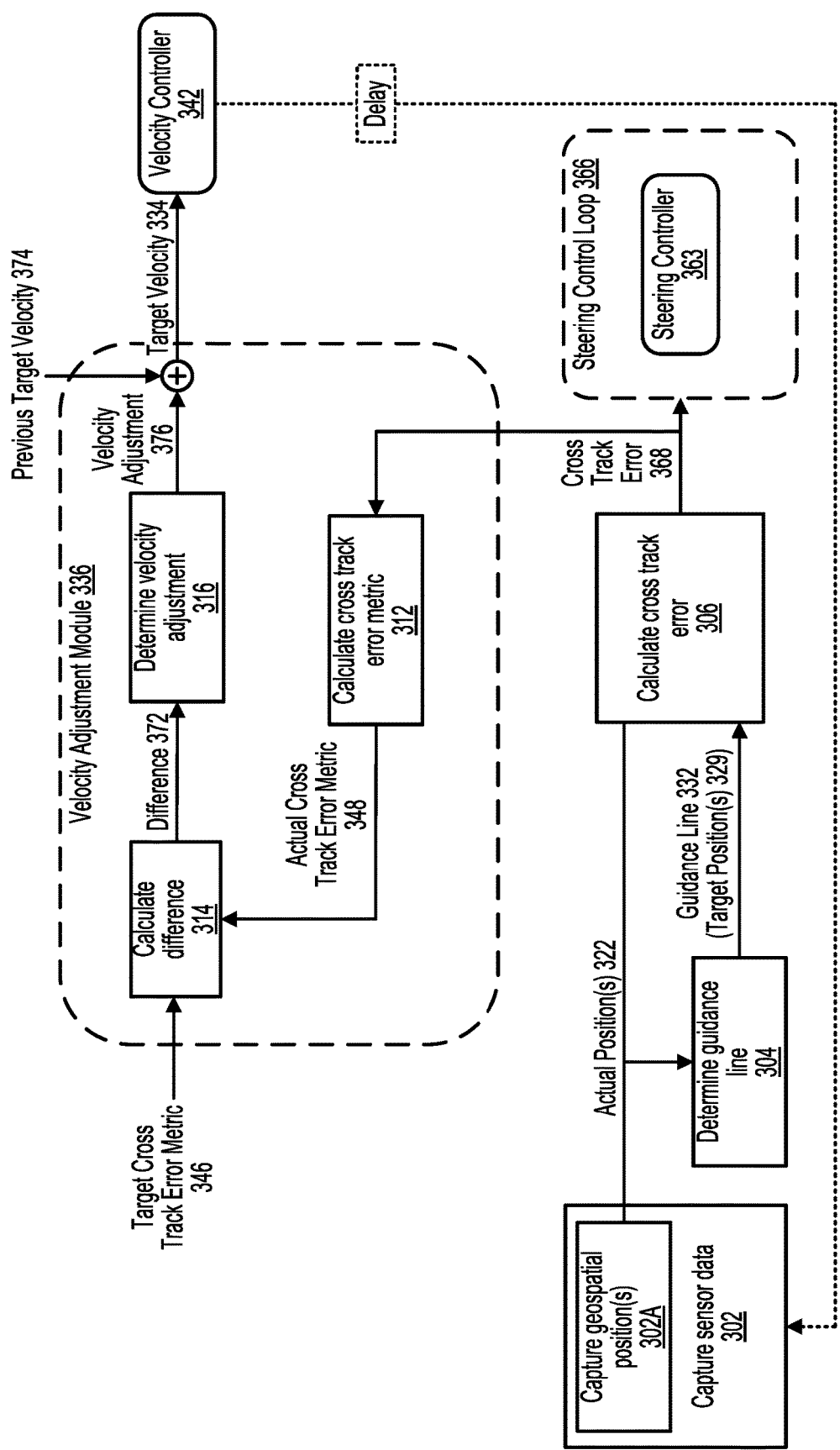
FIG. 3 illustrates an example control process that may be implemented by a machine control system.

FIG. 3 illustrates an example control process 300 that may be implemented by a machine control system, such as machine control system 230, according to some embodiments of the present disclosure. FIG. 3 shows various movement of data and actions performed by the machine control system. In some instances, each iteration of control process 300 begins at block 302, at which sensor data is captured using one or more sensors mounted to the machine, such as to the implement. The sensors may include position sensors, inertial sensors, ultrasonic sensors, laser sensors, among other types of sensors equipped on the mobile machine. Block 302 may include block 302A, at which actual position(s) 322 are captured using one or more position sensors mounted to the machine.

At block 304, a guidance line 332 is determined. Optionally, guidance line 332 may be determined using actual position(s) 322. For example, guidance line 332 may be determined by querying a site design using actual position(s) 322. Guidance line 332 may include one or more target position(s) 329. At block 306, a cross track error 368 between actual position(s) 322 and guidance line 332 and/or between actual position(s) 322 and target position(s) 329 is calculated. Cross track error 368 may be provided to a steering control loop 366 and/or a velocity adjustment module 336. In some embodiments, steering control loop 366 may generate steering commands that are provided to a steering controller 363 to drive cross track error 368 toward zero by steering the mobile machine toward guidance line 332. At block 312, an actual cross track error metric 348 is calculated based on cross track error 368. A target cross track error metric 346 may also be provided to velocity adjustment module 336 using an input device or may be specified in the site design, and at block 314, a difference 372 between actual cross track error metric 348 and target cross track error metric 346 is calculated.

At block 316, a velocity adjustment 376 is determined based on difference 372. The velocity adjustment may be incorporated into (e.g., added to) a previous target velocity 374 to produce a target velocity 334, which is provided to a velocity controller 342. In one example, if difference 372 is less than a threshold or is trending down, the system is considered to be operating "below range", and thus the velocity adjustment is negative such that target velocity 334 is decreased. In the same example, if difference 372 is less than the threshold and is trending up, the system is considered to be operating "with improvement", and thus the velocity adjustment is positive such that target velocity 334 is increased. In the same example, if error 372 is greater than the threshold and is trending up, the system is considered to be operating "above target", and thus the velocity adjustment is positive such that target velocity 334 is increased. In the same example, if none of the above conditions are true, the system is considered to be operating "in range", and thus the velocity adjustment is zero such that target velocity 334 is maintained. In some examples, the rate of change of the velocity is a function (e.g., proportional) of the size of difference 372.

In some instances, target velocity 334 can be filtered so as to not change too quickly, which can yield undesirable results. This can be accomplished using low pass filtering, hysteresis, rate limiting, among other possibilities. In some instances, velocity controller 342 can be configured to receive various types of travel velocity commands, such as absolute travel velocity commands (e.g., travel at 1.5 meters/second) or relative travel velocity commands to the nominal velocity (e.g., travel at 0.1 meters/second above the currently set travel velocity). A machine travel velocity command executing computer can be outfitted with the ability to track and compensate for the machine actual travel velocity.

The above-described steps of control process 300 may be repeated after a predetermined amount of time, as illustrated by the delay path in FIG. 3. Alternatively or additionally, the steps may be repeated in response to one or more of: the availability of new sensor data, a change to guidance line 332, and/or a change to target cross track error metric 346, among other possibilities.

Figure 4:
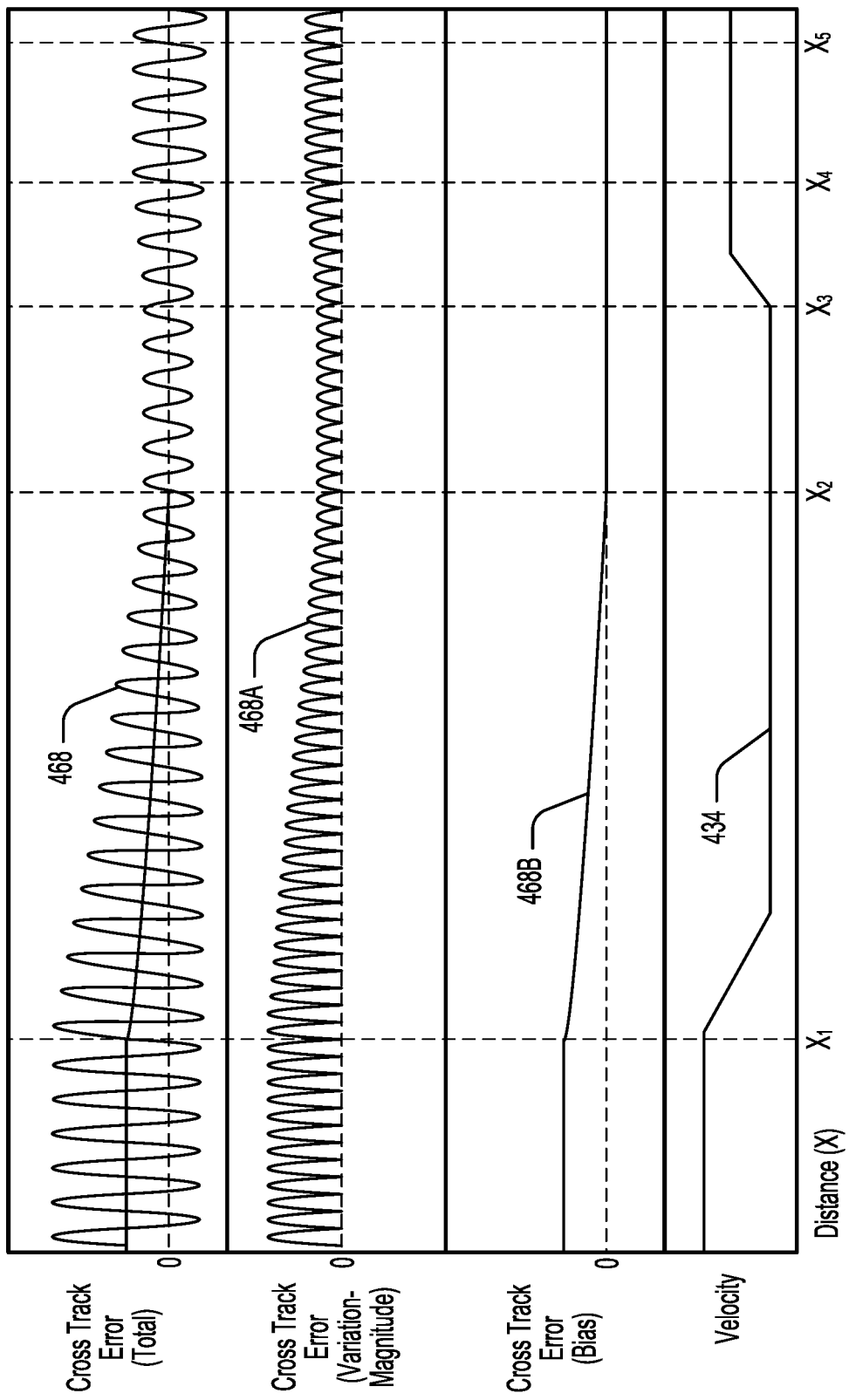
FIG. 4 illustrates example plots showing cross track error and velocity as a function of distance.

FIG. 4 illustrates example plots showing cross track error 468 and velocity 434 as a function of distance, according to some embodiments. Shown are the total cross track error 468, the (magnitude of) variation component 468A of cross track error 468, and the bias component 468B of cross track error 468. Variation component 468A of cross track error 468 may alternatively be referred to as the high-frequency component of cross track error 468 and bias component 468B of cross track error 468 may alternatively be referred to as the low-frequency component of cross track error 468.

In the illustrated example, upon the implement-equipped machine reaching point $X_1$, cross track error 468 may be calculated for the distances prior to point $X_1$. This may include calculating one or both of variation component 468A or bias component 468B of cross track error 468. The machine may then calculate an actual cross track error metric based on one or both of variation component 468A or bias component 468B of cross track error 468. In one example, the machine calculates the actual cross track error metric based on bias component 468B for the distances prior to point $X_1$ by averaging bias component 468B. The machine may then determine that the actual cross track error metric is greater than the target cross track error metric and cause the machine's velocity to decrease. Concurrently, the steering control loop may also consider the calculated cross track error to generate steering commands.

At point $X_2$, cross track error 468 reaches a relatively steady-state condition. Upon the machine reaching point $X_3$, cross track error 468 may be calculated for the distances between point $X_2$ and point $X_3$. This may include calculating one or both of variation component 468A or bias component 468B and calculating an actual cross track error metric based on one or both of variation component 468A or bias component 468B. In one example, the machine calculates the actual cross track error metric based on variation component 468A for the distances between point $X_2$ and point $X_3$ by averaging the magnitude of variation component 468A. The machine may then determine that the actual cross track error metric is less than the target cross track error metric and cause the machine's velocity to increase.

At point $X_4$, cross track error 468 again reaches a relatively steady-state condition. Upon the machine reaching point $X_5$, cross track error 468 may be calculated for the distances between point $X_4$ and point $X_5$, similar to that described above. In one example, the machine calculates the actual cross track error metric based on variation component 468A for the distances between point $X_4$ and point $X_5$ by averaging the magnitude of variation component 468A. The machine may then determine that the actual cross track error metric is within an acceptable range of the target cross track error metric and may cause the machine's velocity to remain the same.

Figure 5:
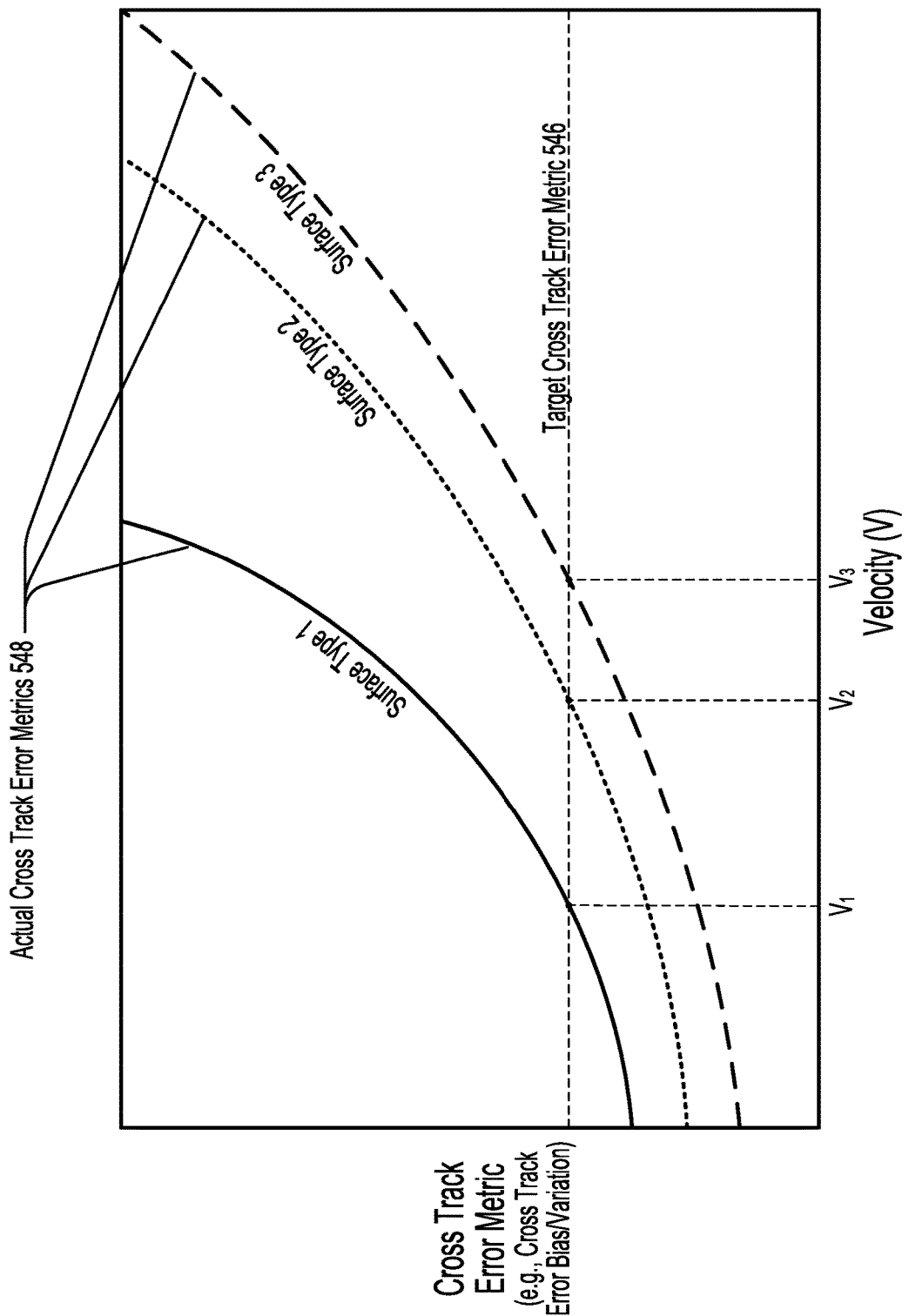
FIG. 5 illustrates an example plot showing cross track error metric as a function of velocity for three different surface types.

FIG. 5 illustrates an example plot showing cross track error metric as a function of velocity for three different surface types, according to some embodiments. In the illustrated example, actual cross track error metrics 548 for three different surface types are plotted as a function of the velocity of the mobile machine, with velocity represented on the horizontal axis and cross track error metric represented on the vertical axis. As described herein, actual cross track error metrics 548 are calculated based on the cross track error, and in the example of FIG. 5, each of actual cross track error metrics 548 is an increasing function of the cross track error, such that higher values of the cross track error metric correspond to worse accuracy of the vehicle steering. When the control process is being executed while the mobile machine is traveling on one of Surface Types 1, 2, or 3, the velocity of the mobile machine is driven toward the velocity at which the corresponding actual cross track error metric 548 is equal to a target cross track error metric 546. This "final" velocity differs for each of the surface types. For example, the final velocity $V_1$ for Surface Type 1 is less than the final velocity $V_2$ for Surface Type 2, which is less than the final velocity $V_3$ for Surface Type 3.

Figure 6:
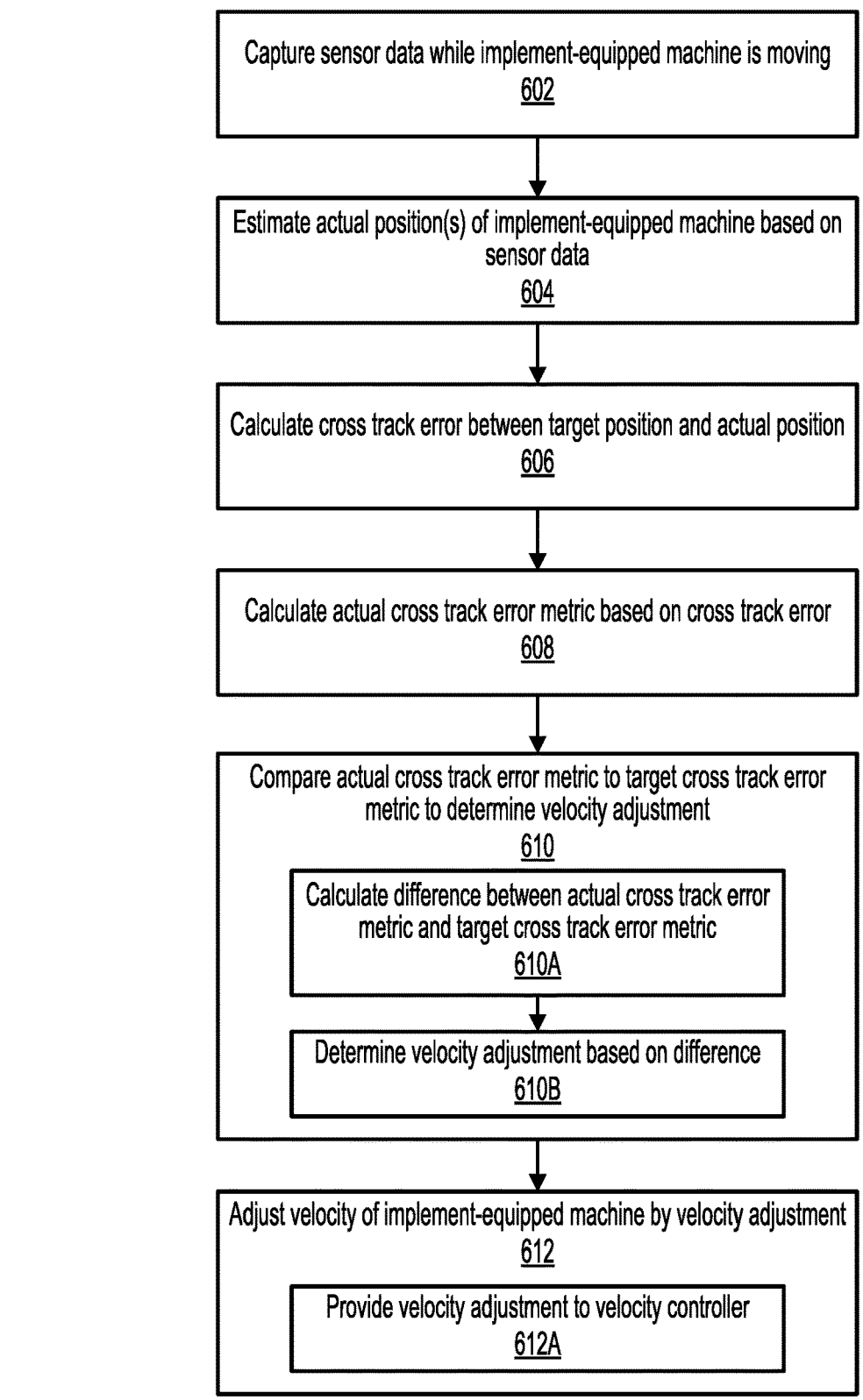
FIG. 6 illustrates a method of controlling a velocity of an implement-equipped machine operating within a site.

FIG. 6 illustrates a method 600 of controlling a velocity of an implement-equipped machine (e.g., implement-equipped machine 150) operating within a site (e.g., site 124). One or more steps of method 600 may be omitted during performance of method 600, and steps of method 600 need not be performed in the order shown. One or more steps of method 600 may be performed by one or more processors, such as those included in a control unit (e.g., control units 160, 260) of the implement-equipped machine. Method 600 may be implemented as a computer-readable medium or computer program product comprising instructions which, when the program is executed by one or more computers, cause the one or more computers to carry out the steps of method 600.

At step 602, sensor data (e.g., sensor data 259) is captured using one or more sensors (e.g., sensors 254) of the implement-equipped machine while the implement-equipped machine is moving at a velocity in a forward or a backward direction. In some embodiments, the sensor data includes data captured by position sensor(s) (e.g., position sensors 155, 255) attached or mounted to the implement-equipped machine. In some embodiments, the sensor data includes inertial data (e.g., inertial data 258) captured by inertial sensor(s) (e.g., inertial sensors 265) attached or mounted to the implement-equipped machine, such as to an implement (e.g., implement 121) of the implement-equipped machine.

At step 604, an actual position (e.g., actual positions 122, 222, 322) of the implement-equipped machine is estimated based on the sensor data captured using the one or more sensors. In some embodiments, the sensor data may include the actual position or, in some embodiments, the actual position may be estimated from the sensor data. In some embodiments, multiple actual positions may be estimated based on the sensor data. In some embodiments, the multiple actual positions may be used to determine the implement-equipped machine's actual velocity.

At step 606, a cross track error (e.g., cross track errors 168, 368, 468) between a target position (e.g., target positions 129, 329) and the actual position is calculated. In some embodiments, step 606 may include calculating the cross track error between a guidance line (e.g., guidance lines 132, 332) including the target position and the actual position. The guidance line may be determined from a site design (e.g., site design 270), may be provided by an input device (e.g., input device 252), may be determined by an autopilot or self driving system, among other possibilities. In some embodiments, the cross track error is a horizontal distance between the target position and the actual position. In some embodiments, the cross track error may be calculated between multiple target positions and multiple actual positions. As such, the cross track error may include a single distance or multiple distances. In some instances, each of the one or more distances may be time referenced (e.g. associated with the time at which the implement-equipped machine captured the sensor data) and, in some instances, the cross track error may be expressed as a function of time or distance.

At step 608, an actual cross track error metric (e.g., actual cross track error metrics 348, 448, 548) is calculated based on the cross track error. In some embodiments, the actual cross track error metric may include a single value that is calculated based on a statistical analysis of the cross track error (or multiple cross track errors). For example, the actual cross track error metric may be equal to an average of the cross track error(s), a weighted average of the cross track error(s) (with more recent values weighted more heavily then less recent values), an inverse of the cross track error(s), an average inverse of the cross track error(s), a maximum of the cross track error(s), a minimum of the cross track error(s), a fitted parameter resulting from a parameterization of the cross track error(s), or some other statistical measure of the cross track error(s) or the N values of the cross track error(s). As such, the actual cross track error metric may be an increasing function of the cross track error (e.g., as the cross track error generally increases, the actual cross track error metric also increases).

At step 610, the actual cross track error metric is compared to a target cross track error metric (e.g., target cross track error metrics 346, 446, 546) to determine a velocity adjustment (e.g., velocity adjustment 376). The velocity adjustment may be determined so that a difference (e.g., difference 372) between the actual cross track error metric and the target cross track error metric is reduced upon the velocity adjustment being applied. The target cross track error metric may be extracted from the site design or may be provided by the input device. In some embodiments, step 610 may include one or both of steps 610A and 610B. At step 610A, the difference is calculated between the actual cross track error metric and the target cross track error metric. In some instances, the difference is calculated by subtracting the actual cross track error metric from the target cross track error metric. At step 610B, the velocity adjustment is determined based on the difference. In embodiments, the velocity adjustment is positive if the actual cross track error metric is less than the target cross track error metric and negative if the actual cross track error metric is greater than the target cross track error metric.

At step 612, the velocity of the implement-equipped machine is adjusted by the velocity adjustment. In some embodiments, a new target velocity (e.g., target velocities 134, 334, 434) is determined based on a previous target velocity (e.g., previous target velocity 374) and the velocity adjustment by, for example, adding the velocity adjustment to the previous target velocity. In some embodiments, step 612 may include providing the velocity adjustment to a velocity controller (e.g., velocity controllers 142, 242, 342) of the implement-equipped machine, which may employ various control mechanisms for driving an actual velocity of the implement-equipped machine toward the target velocity. In some embodiments, one or more control signals (e.g., control signals 278) may be generated and sent to one or more actuators (e.g., actuators 256) of the implement-equipped machine to cause the velocity of the implement-equipped machine to be adjusted by the velocity adjustment.

Figure 7:
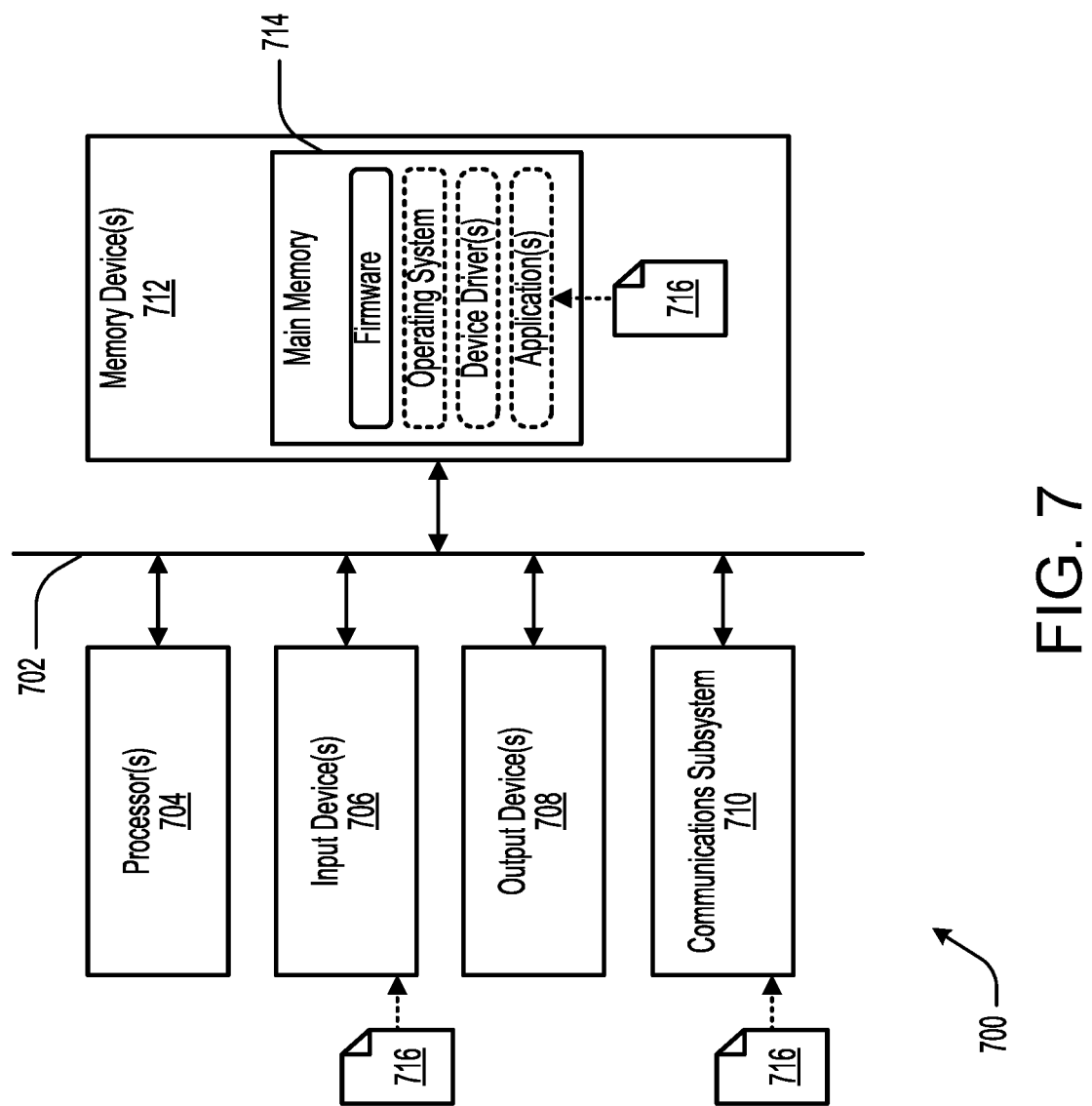
FIG. 7 illustrates an example computer system comprising various hardware elements.

FIG. 7 illustrates an example computer system 700 comprising various hardware elements, according to some embodiments of the present disclosure. Computer system 700 may be incorporated into or integrated with devices described herein and/or may be configured to perform some or all of the steps of the methods provided by various embodiments. For example, in various embodiments, computer system 700 may be incorporated into control units 160, 260 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 700 may be coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses connecting pins of the hardware elements of computer system 700. For example, communication medium 702 may include a bus connecting processor(s) 704 with main memory 714, referred to as a system bus, and a bus connecting main memory 714 with input device(s) 706 or output device(s) 708, referred to as an expansion bus. The system bus may consist of several elements, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 704 may include one or more multi-core processors, in which each core may read and execute program instructions simultaneously with the other cores.

Input device(s) 706 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be provided with control signals by computer system 700.

Communications subsystem 710 may include hardware components for connecting computer system 700 to systems or devices that are located external computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as random-access memory (RAM), such as dynamic RAM (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 716, executable by computer system 700. In one example, such instructions 716 may be received by computer system 700 using communications subsystem 710 (e.g., via a wireless or wired signal carrying instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 700. For example, the non-transitory computer-readable medium may be one of memory device(s) 712, as shown in FIG. 7, with instructions 716 being stored within memory device(s) 712. In some cases, the non-transitory computer-readable medium may be separate from computer system 700. In one example, the non-transitory computer-readable medium may a removable media provided to input device(s) 706, such as those described in reference to input device(s) 706, as shown in FIG. 7, with instructions 716 being provided to input device(s) 706. In another example, the non-transitory computer-readable medium may a component of a remote electronic device, such as a mobile phone, that may wirelessly transmit a data signal carrying instructions 716 to computer system 700 using communications subsystem 716, as shown in FIG. 7, with instructions 716 being provided to communications subsystem 710.

Instructions 716 may take any suitable form to be read and/or executed by computer system 700. For example, instructions 716 may be source code (written in a human-readable programming language such as Java, C, C++, C#, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of controlling a velocity of an implement-equipped machine, the method comprising:
    capturing sensor data using one or more sensors of the implement-equipped machine while the implement-equipped machine is moving at the velocity in a forward or a backward direction;
    estimating an actual position of the implement-equipped machine based on the sensor data captured using the one or more sensors;
    calculating a cross track error between a target position and the actual position, wherein the cross track error includes a variation component and a bias component;
    calculating a value for an actual cross track error metric based on at least the variation component of the cross track error;
    comparing the value for the actual cross track error metric to a value for a target cross track error metric to determine a velocity adjustment, wherein the velocity adjustment is determined so as to reduce a difference between the value for the actual cross track error metric and the value for the target cross track error metric, wherein comparing the value for the actual cross track error metric to the value for the target cross track error metric to determine the velocity adjustment includes:
        determining that the actual cross track error metric is less than the target cross track error metric; and
        in response to determining that the actual cross track error metric is greater than the target cross track error metric, determining the velocity adjustment so as to increase the velocity of the implement-equipped machine; and
    adjusting the velocity of the implement-equipped machine by the velocity adjustment.

2. The computer-implemented method of claim 1, further comprising:
    estimating a plurality of actual positions of the implement-equipped machine based on the sensor data; and
    calculating a plurality of cross track errors between a plurality of target positions and the plurality of actual positions, the plurality of cross track errors including the cross track error and the plurality of target positions including the target position;
    wherein the value for the actual cross track error metric is calculated based on the plurality of cross track errors.

3. The computer-implemented method of claim 1, further comprising:
    determining a guidance line for the implement-equipped machine, the guidance line including the target position, wherein the cross track error is calculated between the guidance line and the actual position.

4. The computer-implemented method of claim 1, wherein adjusting the velocity of the implement-equipped machine by the velocity adjustment includes:
    providing the velocity adjustment to a velocity controller of the implement-equipped machine.

5. The computer-implemented method of claim 1, wherein the one or more sensors include a global navigation satellite systems (GNSS) receiver mounted to the implement-equipped machine.

6. The computer-implemented method of claim 1, wherein the value for the actual cross track error metric is calculated further based on the bias component of the cross track error.

7. A non-transitory computer-readable medium comprising instructions that, when executed by one or more processors, cause the one or more processors to perform operations for controlling a velocity of an implement-equipped machine, the operations comprising:
    capturing sensor data using one or more sensors of the implement-equipped machine while the implement-equipped machine is moving at the velocity in a forward or a backward direction;

estimating an actual position of the implement-equipped machine based on the sensor data captured using the one or more sensors;

calculating a cross track error between a target position and the actual positions wherein the cross track error includes a variation component and a bias component;

calculating a value for an actual cross track error metric based on at least the variation component of the cross track error;

comparing the value for the actual cross track error metric to a value for a target cross track error metric to determine a velocity adjustment, wherein the velocity adjustment is determined so as to reduce a difference between the value for the actual cross track error metric and the value for the target cross track error metric, wherein comparing the value for the actual cross track error metric to the value for the target cross track error metric to determine the velocity adjustment includes:

determining that the actual cross track error metric is less than the target cross track error metric; and in response to determining that the actual cross track error metric is greater than the target cross track error metric, determining the velocity adjustment so as to increase the velocity of the implement-equipped machine; and adjusting the velocity of the implement-equipped machine by the velocity adjustment.

8. The non-transitory computer-readable medium of claim 7, further comprising:

estimating a plurality of actual positions of the implement-equipped machine based on the sensor data; and calculating a plurality of cross track errors between a plurality of target positions and the plurality of actual positions, the plurality of cross track errors including the cross track error and the plurality of target positions including the target position;

wherein the value for the actual cross track error metric is calculated based on the plurality of cross track errors.

9. The non-transitory computer-readable medium of claim 7, further comprising:

determining a guidance line for the implement-equipped machine, the guidance line including the target position, wherein the cross track error is calculated between the guidance line and the actual position.

10. The non-transitory computer-readable medium of claim 7, wherein adjusting the velocity of the implement-equipped machine by the velocity adjustment includes:

providing the velocity adjustment to a velocity controller of the implement-equipped machine.

11. The non-transitory computer-readable medium of claim 7, wherein the one or more sensors include a global navigation satellite systems (GNSS) receiver mounted to the implement-equipped machine.

12. The non-transitory computer-readable medium of claim 7, wherein the value for the actual cross track error metric is calculated further based on the bias component of the cross track error.

13. A system comprising:

one or more processors; and a computer-readable medium comprising instructions that, when executed by the one or more processors, cause the one or more processors to perform operations comprising:

capturing sensor data using one or more sensors of a implement-equipped machine while the implement-equipped machine is moving at a velocity in a forward or a backward direction;

estimating an actual position of the implement-equipped machine based on the sensor data captured using the one or more sensors;

calculating a cross track error between a target position and the actual position, wherein the cross track error includes a variation component and a bias component;

calculating a value for an actual cross track error metric based on at least the variation component of the cross track error;

comparing the value for the actual cross track error metric to a value for a target cross track error metric to determine a velocity adjustment, wherein the velocity adjustment is determined so as to reduce a difference between the value for the actual cross track error metric and the value for the target cross track error metric, wherein comparing the value for the actual cross track error metric to the value for the target cross track error metric to determine the velocity adjustment includes:

determining that the actual cross track error metric is less than the target cross track error metric; and in response to determining that the actual cross track error metric is greater than the target cross track error metric, determining the velocity adjustment so as to increase the velocity of the implement-equipped machine; and adjusting the velocity of the implement-equipped machine by the velocity adjustment.

14. The system of claim 13, further comprising:

estimating a plurality of actual positions of the implement-equipped machine based on the sensor data; and calculating a plurality of cross track errors between a plurality of target positions and the plurality of actual positions, the plurality of cross track errors including the cross track error and the plurality of target positions including the target position;

wherein the value for the actual cross track error metric is calculated based on the plurality of cross track errors.

15. The system of claim 13, further comprising:

determining a guidance line for the implement-equipped machine, the guidance line including the target position, wherein the cross track error is calculated between the guidance line and the actual position.

16. The system of claim 13, wherein adjusting the velocity of the implement-equipped machine by the velocity adjustment includes:

providing the velocity adjustment to a velocity controller of the implement-equipped machine.

* * * * *